United States Patent [19]
Rak

[11] Patent Number: 5,061,372
[45] Date of Patent: * Oct. 29, 1991

[54] WATER TREATMENT SYSTEM WITH PRESERVICE RINSE

[75] Inventor: Stanley F. Rak, Mundelein, Ill.

[73] Assignee: Culligan International Company, Northbrook, Ill.

[ * ] Notice: The portion of the term of this patent subsequent to Nov. 13, 2007 has been disclaimed.

[21] Appl. No.: 625,537

[22] Filed: Dec. 11, 1990

[51] Int. Cl.$^5$ .......................... C02F 1/42; B01D 24/48
[52] U.S. Cl. ................... 210/673; 210/742; 210/140; 210/269
[58] Field of Search .............. 210/673, 742, 140, 269, 210/670, 138, 139, 142, 739

[56] References Cited

U.S. PATENT DOCUMENTS

| | | | |
|---|---|---|---|
| 1,794,765 | 3/1931 | Green | 210/269 |
| 1,834,387 | 12/1931 | Dotterweich | 210/269 |
| 2,744,868 | 5/1956 | Harting | 210/269 |
| 3,002,922 | 10/1961 | Baddour | 210/269 |
| 3,003,638 | 10/1961 | Kryzer et al. | 210/269 |
| 3,058,816 | 10/1962 | Rudelick | 210/269 |
| 3,101,316 | 8/1963 | Rose | 210/269 |
| 3,208,934 | 9/1965 | Kingsbury | 210/269 |
| 3,989,624 | 11/1976 | Wachsmuth | 210/269 |
| 4,104,158 | 8/1978 | Davis | 210/670 |
| 4,104,165 | 8/1978 | Braswell | 210/673 |
| 4,133,759 | 1/1979 | Ikeda et al. | 210/138 |
| 4,154,677 | 5/1979 | Mantell | 210/138 |
| 4,181,605 | 1/1980 | Braswell | 210/673 |
| 4,228,000 | 10/1980 | Hoeschler | 210/673 |
| 4,237,538 | 12/1980 | Le Dall | 210/670 |
| 4,385,357 | 5/1983 | Davis | 210/670 |
| 4,394,262 | 7/1983 | Bukowski et al. | 210/138 |
| 4,536,845 | 8/1985 | DeVale et al. | 210/140 |
| 4,668,402 | 5/1987 | Norton | 210/140 |
| 4,704,202 | 11/1987 | Poyner | 210/138 |
| 4,722,797 | 2/1988 | Gauer et al. | 210/670 |
| 4,764,280 | 8/1988 | Brown et al. | 210/673 |
| 4,849,111 | 7/1989 | Abrams | 210/673 |
| 4,970,003 | 11/1990 | Rak | 210/673 |

Primary Examiner—Stanley S. Silverman
Assistant Examiner—Cynthia L. Nessler
Attorney, Agent, or Firm—Gerstman & Ellis, Ltd.

[57] ABSTRACT

A water treatment system is provided including a service step, a regenerating step and a rinse step. The service step includes introducing water to be treated into the inlet, through a treatment medium and out the outlet to a service location. If a prolonged period of idleness is determined automatically, a rinse step is automatically provided by which an amount of water to be treated is introduced into the inlet, through the treatment medium and out of the outlet to drain.

7 Claims, 1 Drawing Sheet

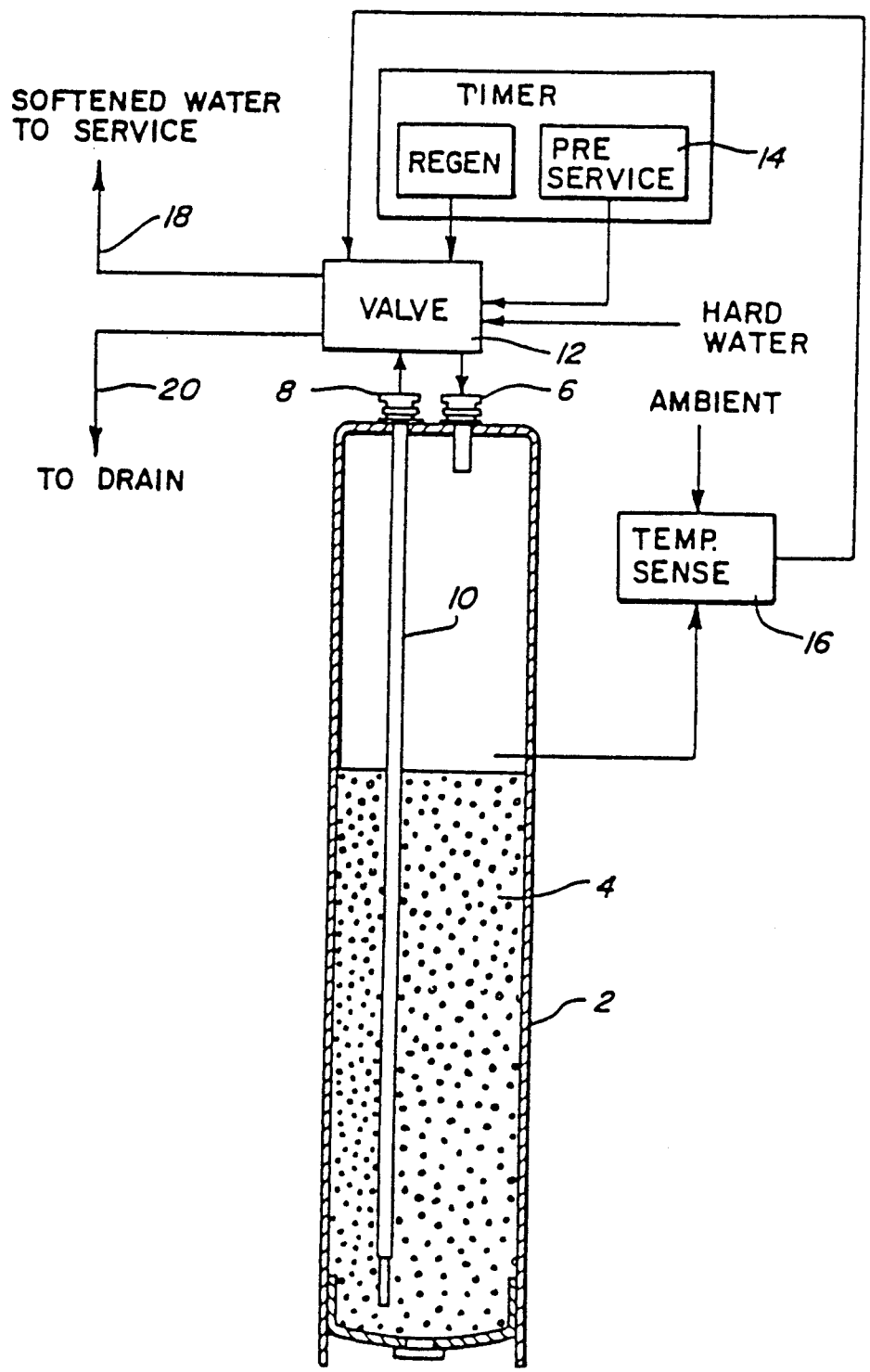

WATER TREATMENT SYSTEM WITH PRESERVICE RINSE

CROSS REFERENCE TO RELATED APPLICATION

This application is related to Rak U.S. application Ser. No. 464,383, filed Jan. 12, 1990, now U.S. Pat. No. 4,970,003.

FIELD OF THE INVENTION

The present invention concerns a novel water treatment system.

BACKGROUND OF THE INVENTION

In areas where hard water is present, water softeners are frequently used. Typically, a water softening tank contains an ion exchange resin. During water service, fresh, relatively hard water is introduced into the inlet, passed through the ion exchange resin, and it exits via the outlet to a service location. Occasionally the ion exchange resin must be regenerated. To this end, a brine solution is introduced into the inlet, it flows through the ion exchange resin and exits the outlet from which it is pumped to drain. When the regeneration is completed, a valve switches the outlet line to service.

If the water softener has not been used for a certain amount of time, the possibility of a contamination problem exists. For example, in a water softener that is inactive, contaminants may build up in the resin. Further, as a result of the water in the softener tank being stagnate for a certain amount of time, the stagnant water may become contaminated. If the ion exchange resin is contaminated or if the water in the softener tank is contaminated, the initial amount of service water that flows may also be contaminated. It is, therefore, an object of the invention to provide a water softening system in which the contamination problem is alleviated.

Although the illustrative embodiment of the invention is directed to a water softening system, the present invention also concerns other systems for treating water, such as filtering systems, reverse osmosis systems, etc.

Other objects and advantages of the present invention will become apparent as the description proceeds.

SUMMARY OF THE INVENTION

In accordance with the present invention, a water treatment process is provided in which the water conditioner has an inlet, a treatment medium and an outlet. The process comprises the providing of service by introducing water to be treated into the inlet, through the treatment medium and out the outlet to a service location The treatment medium is regenerated at various intervals. The regeneration step includes chemical, mechanical, electrolytical or hydraulic regeneration of the treatment medium. If a prolonged period of idleness is automatically determined, a rinse step is automatically provided which comprises the step of introducing an amount of the water to be treated into the inlet, through the treatment medium and out the outlet drain.

In one embodiment of the invention, a determination is made as to the length of time that the water conditioner has not been used for service. The rinse step is provided only if the water conditioner has not been used for a predetermined time period.

In another form of the invention, the rinse step is timed so that it occurs at a predetermined time of the day.

In another form of the invention, the temperature differential between the ambient air and the water present in the water conditioner is sensed. The rinse step is provided only if the temperature differential between the ambient air and the water present in the water conditioner is less than a predetermined amount.

A more detailed explanation of the invention is provided in the following description and claims, and is illustrated in the accompanying drawing.

BRIEF DESCRIPTION OF THE DRAWING

The drawing shows a water treatment system in diagrammatic form.

DETAILED DESCRIPTION OF THE ILLUSTRATIVE EMBODIMENT

Referring to the drawing, a water softening tank 2 is shown therein containing a bed of ion exchange resin 4. The tank comprises an inlet 6 and an outlet 8 having a conduit 10 extending downward and through the ion exchange resin 4 to a lower portion of tank 2.

A valve 12 is coupled to outlet 8 and is controlled by a timer 14 and/or a temperature differential sensor 16. Timer 14 includes a regeneration step setting, and a preservice (rinse) setting. Valve 12 directs the outlet water either to service via line 18 or to drain via line 20. When the timer is in its regeneration mode or is in its preservice (rinse) mode, the valve is operated to direct the outlet water to drain. Likewise, when the temperature differential sensor 16 senses a temperature differential between the ambient air and the water that is within the softener tank 2 that varies by less than a predetermined differential, valve 12 will operate to direct the outlet water to drain. At other times, valve 12 directs the outlet water to service.

During the service step, the fresh, relatively hard water is introduced via valve 12 to inlet 6, flows through ion exchange resin 4, through conduit 10 and to outlet 8. Valve 12 is set to direct the outlet water via line 18 to service. Periodically, at a time when water service is not customary, timer 14 operates to place the valve in its regeneration mode. When in the regeneration mode, brine solution is introduced into inlet 6 and the valve 12 switches the flow of the outlet water to drain.

To backwash the system, the valve 12 is actuated to provide flow of the hard water directly into outlet 8, through resin 4, and out of inlet 6, to drain.

In order to alleviate contamination that has possibly built up due to inactivity of the softener, resulting in stagnant water and/or contaminant build-up in the ion exchange resin, a preservice or initial rinse step is provided. To this end, prior to service the fresh inlet water is directed through the ion exchange resin and to drain.

In one form of the invention, timer 14 operates to provide a preservice rinse at a predetermined time or times of the day. For example, if service is ordinarily required at 6:00 a.m. each day, timer 14 may provide a preservice rinse at 5:30 a.m. each day. As a specific example although no limitation is intended, the rinse could comprise one to two bed volumes of rinse water.

In another form, a combination flow switch and timer is provided. If the flow switch has been inactive for a predetermined amount of time, this indicates that the softener has been inactive and the rinse step will proceed prior to valve 12 switching to its service mode.

In another form, temperature differential 16 is used to sense the difference in the temperature between the ambient air and the water that is within the softener tank. If the water contained in the tank is at approximately ambient air temperature, it will be determined that the softener has been inactive for a certain time and, valve 12 will provide an automatic rinse cycle prior to switching to its service cycle once a faucet is opened for service.

A determination concerning the temperature of the water within the tank can be made with a temperature sensor that is in heat exchange with the outside of the tank, thereby obviating the need to position a temperature sensor directly inside of the tank.

Although illustrative embodiments of the invention have been described, it is to be understood that various modifications and substitutions may be made by those skilled in the art without departing from the novel spirit and scope of the present invention. For example, instead of the water treatment system comprising a softener, it could comprise filtering apparatus using a filter instead of ion exchange resin. Likewise, in a reverse osmosis system a reverse osmosis membrane would be used instead of the ion exchange resin.

I claim:

1. A water treatment process, comprising the steps of:
   providing a water conditioner having an inlet, a treating medium, and an outlet;
   providing service by introducing fresh water into the inlet, through the treating medium and out the outlet to a service location;
   regenerating the treating medium at various intervals;
   after a prolonged period of idleness is automatically determined, automatically providing an initial rinse step comprising the step of introducing an amount of the fresh water into the inlet, through the treating medium and out the outlet to drain.

2. A water treatment process as defined by claim 1, including the steps of sensing the temperature differential between the ambient air and the water present in the conditioner, and providing the rinse step only if the temperature differential is less than a predetermined amount.

3. A water treating process as defined by claim 1, including the step of determining the length of time that the conditioner has not been used for service, and providing the rinse step only if the conditioner has not been used for a predetermined time period.

4. A water treatment process as defined by claim 1, including the steps of providing a flow switch and timer, and determining by the inactivity of the flow switch over a period of time that there has been no flow for a predetermined period of time, and providing the rinse step only if there has been no flow for a predetermined period of time.

5. A water treatment process as defined by claim 1, including the step of timing the rinse step so that it occurs at a predetermined time of the day.

6. A water treatment process, comprising the steps of:
   providing a water conditioner having an inlet, a treatment medium, and an outlet;
   providing service by introducing fresh water into the inlet, through the treatment medium and out the outlet to a service location;
   regenerating the treatment medium at various intervals;
   prior to the service step, providing a rinse step comprising the step of introducing an amount of the fresh water into the inlet, through the treatment medium and out the outlet to drain,
   sensing the temperature differential between the ambient air and the water present in the conditioner, and providing the rinse step only if the temperature differential is less than a predetermined amount.

7. A water treatment process, comprising the steps of:
   providing a water conditioner having an inlet, a treating medium, and an outlet;
   providing service by introducing fresh water into the inlet, through the treating medium and out the outlet to a service location;
   regenerating the treatment medium at various intervals;
   prior to the service step, providing a rinse step comprising the step of introducing an amount of the fresh water into the inlet, through the treating medium and out the outlet to drain;
   providing a flow switch and timer, and determining by the inactivity of the flow switch over a period of time that there has been no flow for a predetermined period of time, and providing the rinse step only if there has been no flow for a predetermined period of time.

* * * * *